Sept. 8, 1964   J. A. SCHLENZ   3,148,261
WELDER'S CABLE TENDING REELS
Filed July 9, 1962   2 Sheets-Sheet 1

INVENTOR.
JOSEPH A. SCHLENZ
BY
ATTORNEY

Sept. 8, 1964 J. A. SCHLENZ 3,148,261
WELDER'S CABLE TENDING REELS
Filed July 9, 1962 2 Sheets-Sheet 2
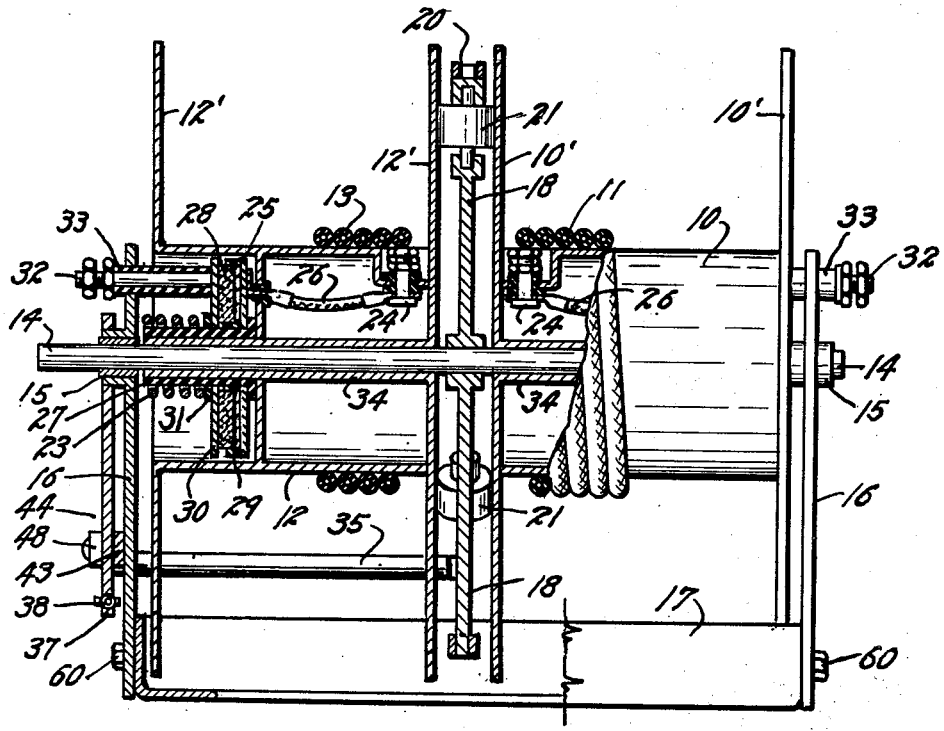
Fig. 3
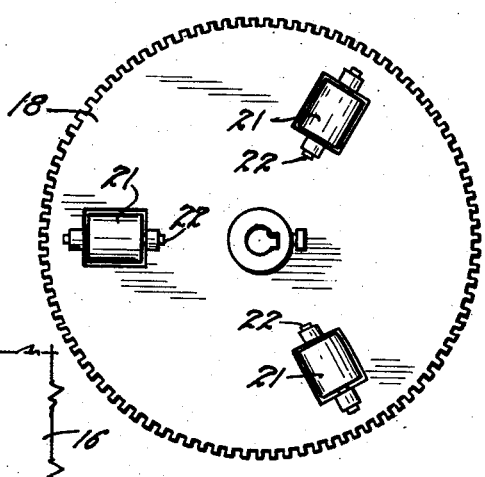
Fig. 4
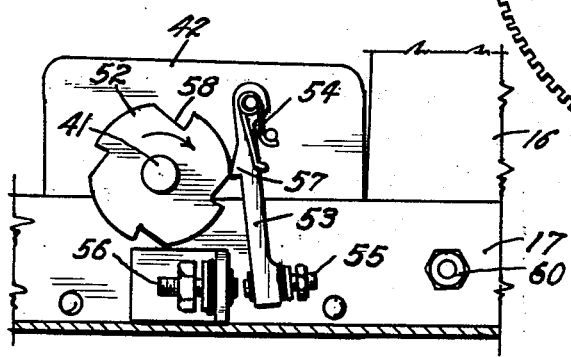
Fig. 5
INVENTOR.
JOSEPH A. SCHLENZ
BY
ATTORNEY

United States Patent Office 3,148,261
Patented Sept. 8, 1964

3,148,261
WELDER'S CABLE TENDING REELS
Joseph Adolph Schlenz, Derby, Colo.
(6966 Garden Court, Commerce City, Colo.)
Filed July 9, 1962, Ser. No. 208,244
4 Claims. (Cl. 200—153)

This invention relates to an automatic reel for electric welder's cables. In electric arc welding, two electric cables are employed, a ground cable attached to the work and a welding cable terminating in an electrode holder. The latter cables are exceedingly inconvenient to handle especially when the welding is being done at a distance from the generator or other electric supply. The cables will often become entangled with and covered by construction materials and equipment and damaged by trucks and other traffic running thereover.

The principal object of this invention is to provide an automatic, power-driven, cable tending reel which: will always maintain the unused portion of each cable in a neatly reeled condition; will allow the cables to be easily drawn from the reel to the work; which will automatically take up the slack in each cable independently of the other cable; which when the work has been completed will immediately reel in both cables; and which when the cables have been completely rereeled will automatically shut off the power to the reeling mechanism.

Another object is to provide a control means for a power-driven cable retracting reel for electric welder's cables which can be manipulated by simply pulling upon or releasing the tension in the welding cable so as not to require any additional controls which would distract the attention of the welder from the work.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

FIG. 3 is a cross section taken on the line 3—3, FIG. 1;

FIG. 4 is a detail face view of a differential drive sprocket employed in the invention; and FIG. 5 is an enlarged fragmentary, detail section taken on the line 5—5, FIG. 1 showing the inner face of a motor control switch to be later described.

Figure 1:
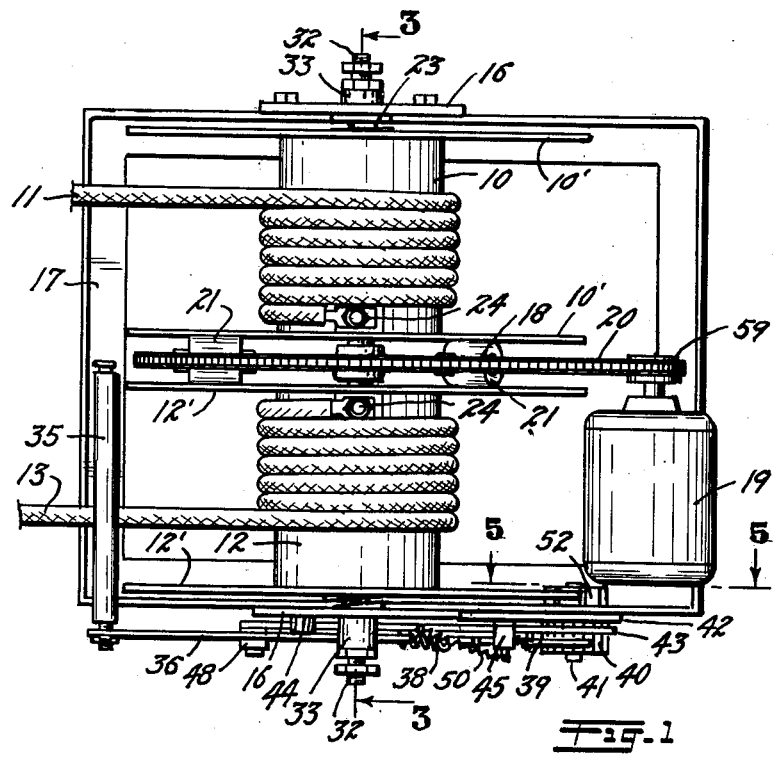
FIG. 1 is a plan view of the improved welder's cable reel.
Figure 2:
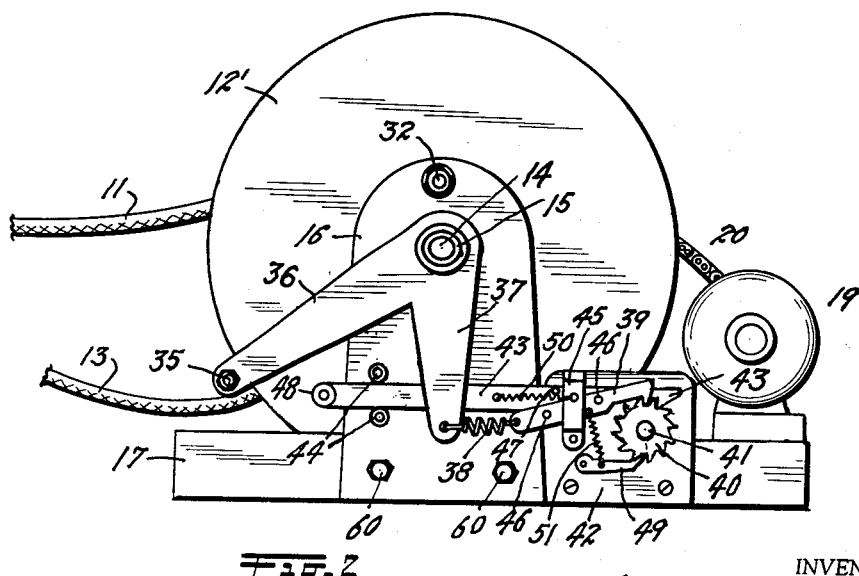
FIG. 2 is a right-side elevational view thereof.

The improved automatic reel employs two reel spools, a ground cable spool 10 upon which the ground cable, indicated at 11, is wound, and a welding cable spool 12 upon which the welding cable, indicated at 13, is wound. The spool 10 has relatively large diameter circular side plates 10' to confine the cable turns to the spool and the spool 12 has similar side plates 12'.

The spools 10 and 12 have tubular hubs 34 which are rotatably mounted on a common spool shaft 14 which in turn is rotatable in bearing bushings 15 mounted in upstanding, shaft-supporting plates 16. The shaft supporting plates 16 are bolted, as indicated at 60, to, and extend upwardly from, the opposite sides of an open rectangular angle-iron bed frame 17.

It can be seen from the above that the spools 10 and 12 are free to rotate on the shaft 14 and that the latter shaft is free to rotate in its bearing bushings 15.

Rotation is imparted to the shaft 14 through the medium of a relatively large, circular, plate-like, toothed differential sprocket 18 as illustrated in FIG. 4. The sprocket is fixedly mounted on the shaft 14 between the adjacent side plates 10' and 12' of the spools and is driven from a suitable power source, such as from an electric motor 19, through the medium of a conventional sprocket chain 20. The motor is preferably provided with a directional-clutch-type sprocket 59 which will drive the chain 20 forwardly yet allow it to move freely rearwardly.

Rotation is imparted to the spools 10 and 12 through the medium of differential rollers 21 mounted on radially extending axles 22 and positioned in openings in the differential sprocket 18 so as to project oppositely outward from both faces of the sprocket 18 into frictional contact with the adjacent end plates of the spools. There are, preferably, three of the differential rollers spaced 120° apart and they are preferably rubber covered to increase their coefficient of friction with the end plates. The adjacent end plates are constantly urged against the differential rollers by means of compression springs 23 surrounding the shaft 14 against the supporting plates 16 and acting to resiliently force the two spools toward each other.

Thus, it can be seen that if the spool shaft 14 is rotating and the spools 10 and 12 are free, the differential rollers will remain stationary and will cause the two spools to rotate in unison with the shaft. If, however, either of the spools is held against rotation, the differential rollers will travel forwardly on the stationary spool and drive the other spool forwardly at double speed due to the differential action of the rollers 21.

The welding current is similarly conducted to both cables 11 and 13, that is, each cable is connected to a binding post 24 indented into and electrically insulated from its spool. The binding posts 24 are connected to a brush holder 25 axially mounted in the outer extremity of each spool through the medium of a conductor 26. The brush holders are mounted on insulating sleeves 27 surrounding the hubs 34 of the spools and each holder carries a circumferential plurality of segment-shaped carbon brushes 28 held in place by a suitable brush retainer 29. A circular, copper commutator plate 30 is slidably and concentrically mounted on each insulating sleeve 27 and is constantly urged into frictional contact with the brushes 28 by means of one of the previously described compression springs 23. The springs are suitably insulated from their commutator plates 30, such as by means of fiber washers 31. A conductor post 32, surrounded by an insulating tube 33 is formed on and projects eccentrically outward from each commutator plate 30. The posts 32 with their insulating tubes 33 extend through guide openings in the shaft supporting plates 16 to receive the power mains from the welding current supply source.

It can be seen from the above that the springs 23 serve a double purpose, that is, they maintain frictional contact between the commutator plates 30 and the brushes 28 and they also maintain the inner spool side plates against the differential rollers 21. The conductor posts 32 also serve a double purpose, that is, they conduct current to the commutator plates 30 and they also prevent rotation of the latter plates.

The current supply to the motor is controlled by a lift bar 35 beneath which the welding cable 13 is passed. The lift bar 35 extends inwardly across the front of the welding cable spool 12 from the extremity of a lever member 36 which is rotatably mounted on one of the bearing bushings 15. A switch operating lever 37 extends downwardly from and moves as a unit with the lever member 36. The lower extremity of the lever 37 is connected, through the medium of a tension spring 38, with an elongated, slidable, first ratchet pawl 39 which engages the teeth of a ratchet wheel 40. The ratchet wheel 40 is mounted on a switch shaft 41 extending through and rotatably mounted in a switch plate 42 which is attached to the bed frame 17. A second elongated ratchet pawl 43 also engages the teeth of the ratchet wheel 40 alongside of the first pawl 39 and is supported horizontally across the shaft post 16 behind the lever 37 upon suitable guide rollers 44. Both ratchet pawls are held in place against the switch plate 42 by means of a retaining strap 45.

Spaced-apart stop pins 46 project from the ratchet pawl 39 on opposite sides of the retaining strap 45 and similarly spaced stop pins 47 project from the second ratchet pawl 43. The stop pins 46 and 47 are spaced to limit the reciprocal movement of the pawl 39 to one-tooth space on the ratchet wheel and act to limit the forward and back movement of the ratchet pawls 39 and 43 to a single tooth-space on the ratchet wheel 40. A stop roller stud 48 projects outwardly from the extremity of the second ratchet pawl 43 into the path of movement of the switch operating lever 37 to transmit movement from the latter lever to the pawl 43 when the lift bar 35 is raised to its extreme upward position.

Return rotation of the ratchet wheel 40 is prevented by means of a click 49 engaging the teeth of the former. A tension spring 50 constantly returns the ratchet pawl 43 after each actuation and a similar spring 51 returns the ratchet pawl 39 and also acts to maintain the click 49 in contact with the teeth of the ratchet wheel.

The ratchet wheel 40 has an even number of teeth, preferably twelve teeth as illustrated. Thus, it can be seen from the above that if either ratchet pawl 39 or 43 be moved forward and back the switch shaft 41 will be rotated forwardly 30°. The rotation of the switch shaft is employed to actuate a rotary switch of a type which will close a circuit to the motor 19 at 90° intervals or at each third actuation of the switch shaft. The switch may be any suitable conventional rotary switch, which will serve the purpose. As illustrated, it comprises a cam wheel 52 notched at 90° intervals as indicated at 58. A cam follower lever 53 is provided, with a follower point 57 which rides the cam wheel 52 and is constantly urged toward the latter by a suitable spring 54. The follower lever carries an insulated movable contact 55 which contacts an insulated stationary contact 56. In use, the contacts are connected in series with the motor 19 as to close the circuit to the motor 19 each time a follower point 57 on the follower lever enters one of the notches 58.

Let us assume that the cables are reeled on their spools 10 and 12, that the welding current source is connected to the conductor posts 32, and that the cam wheel 52 is in the position of FIG. 5, that is one tooth space past the "on" position. The welder now pulls the cables to the job causing an unwinding rotation of both spools. If the motor is provided with a directional clutch, it will remain stationary during the reverse rotation otherwise it will rotate rearwardly under the manual actuation.

The pulling of the welding cables to the job will swing the lift bar 35 upwardly causing the pawl 39, through the resilient stretching of the spring 38, to be pulled forwardly one tooth space with the current to the motor still remaining "off." When the job is reached, and the cables are relaxed, the lift bar drops and the pawl 39 moves rearwardly to engage the next tooth. The device will remain in this position until the weld is completed and it is desired to rereel the cables. To do this, it is only necessary for the welder to give a tug on the welding cable 13 to raise the lift bar to cause the pawl 39 to rotate the cam wheel 52 forwardly an additional tooth space. This is the third actuation so that the cam follower point 57 will now drop into one of the notches 58 in the cam wheel closing the circuit to the motor at the contacts 55 and 56 so that the motor will rotate the spools to reel in the cables.

The reeling action can be stopped by the operator at any time by simply retarding the welding cable which will cause the lift bar to rise to cause the ratchet pawl to rotate the cam wheel back to the original "off" position of FIG. 5.

Should the cables be left unattended, as they are being reeled, the electrode holder on the welding cable will eventually engage the lift bar 35 and as the spool rotates upwardly it will swing the switch lever 35 forwardly into contact with the stop roller stud 48 causing the second ratchet pawl 43 to rotate the cam wheel to the "off" position without attention on the part of the welder.

While a specific form of the improvement has been described and illustrated herein, it is to be understood that the same may be varied, within the scope of the appended claims, without departing from the spirit of the invention.

Having thus described the invention, what is claimed and desired to be secured by Letters Patent is:

1. A device for reeling the ground and welding cables of an electric welder comprising: a spool shaft; a ground cable spool; a welding cable spool, said spools being rotatably and adjacently mounted on said spool shaft; an electric motor operatively connected to said shaft; means for transmitting motion from said shaft to said spools for reeling the respective cables on their spools; a vertically movable lift bar extending across one of said spools beneath which the welding cable passes to its respective spool; a first lever member pivotally mounted at the axis of said shaft and supporting said lift bar at its free extremity, a second lever member projecting from said first lever member and moving as a unit therewith; a rotatable switch shaft; a ratchet wheel mounted on said shaft; a cam wheel mounted on said shaft; means operable from the contour of said cam for opening and closing a circuit to said motor; a ratchet pawl arranged to engage said ratchet wheel; and means connecting said second lever member with said ratchet pawl for intermittently actuating the latter in correspondence with the movements of said second lever means.

2. A device as described in claim 1 having a second ratchet pawl also arranged to engage said ratchet wheel and stop means on said second ratchet pawl positioned to be engaged by said second lever member when said lift bar approaches its extreme vertical position to rotate said cam wheel to open said circuit independently of said first pawl.

3. A device as described in claim 1 in which the means for transmitting motion from said shaft to said spools comprises a sprocket driven by said motor, said sprocket being fixedly mounted on said shaft between said spools, differential rollers mounted on radial axes in said sprocket and projecting oppositely outward therefrom; and spring means urging said spools axially of said shaft into engagement with said rollers.

4. A device as described in claim 3 in which each cable is electrically insulated from its respective spool and each is connected to a brush element which rotates with its respective spool and having a stationary commutator plate in electrical contact with each brush element, said spring means acting against said commutator plates to urge the latter against said brush elements and to urge said spools against said differential rollers.

References Cited in the file of this patent

UNITED STATES PATENTS 2,848,571   Carroll _____ Aug. 19, 1958